G. A. Davison,

Gang Plow.

No. 3,669. Reissued Oct. 12. 1869.

Witnesses:
Jno. L. Boone
Geo. H. Strong

Inventor:
G. A. Davison
By Dewey & Co
Attorneys

N. PETERS, PHOTO-LITHOGRAPHER, WASHINGTON, D. C.

United States Patent Office.

GUSTAVUS A. DAVISON, OF SAN LEANDRO, CALIFORNIA.

*Letters Patent No.* 79,639, *dated July* 7, 1868; *reissue No.* 3,669, *dated October* 12, 1869.

IMPROVEMENT IN GANG-PLOWS.

The Schedule referred to in these Letters Patent and making part of the same.

*To all whom it may concern:*

Be it known that I, GUSTAVUS A. DAVISON, of San Leandro, county of Alameda, State of California, have invented an Improved Gang-Plow; and I do hereby declare the following description, and accompanying drawings, are sufficient to enable any person skilled in the art or science to which it most nearly appertains, to make and use my said invention or improvement, without further invention or experiment.

The nature of my invention is to provide an improved gang-plow; and consists in a device for raising and lowering the frame, whereby the plows are made to cut shallow or deep, or elevated entirely above the ground, when travelling from field to field.

My invention also relates to a jointed axle, regulated by a set-screw, so that one of the wheels of the machine may be adjusted to travel or rotate on the same plane as the other or land-wheel.

To more fully illustrate and describe my invention, reference is had to the accompanying drawings, and the letters marked thereon, forming a part of this specification, of which—

A A′ is the frame, consisting of two longitudinal beams, and placed across the axle, the beam A′ being a little the longer, and the two connected by a cross-bar, B.

The pole-attachment, C, is made between the forward portion of the frame by being bolted to it.

A convenient seat, D, for the driver is placed above the frame, and attached to the sides.

The axle E is provided with three rigid arms, G, H, and H′, one forward and two in the rear.

To the arm G is connected a link, I, which is formed by a connection to the arm, and the end of the curved sweep or lever I.

This sweep is pivoted to the side of the beam A, above which is placed a curved rack.

The lever may be directly attached to the arm G of the axle, but I prefer the link-attachment, for by its use much greater leverage is obtained.

Figure 1:
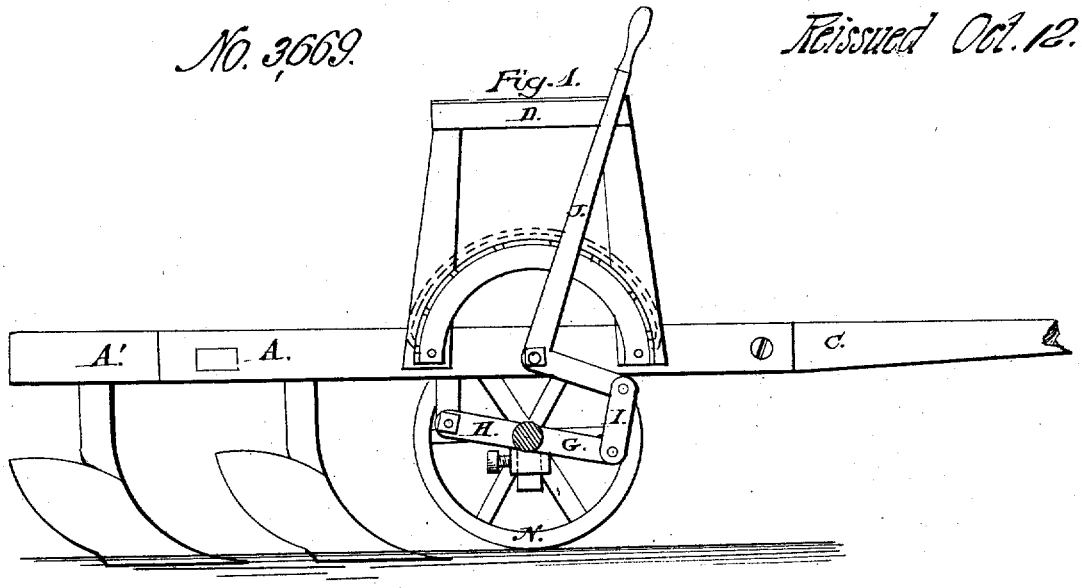
Figure 1 is a side elevation.
Figure 2:
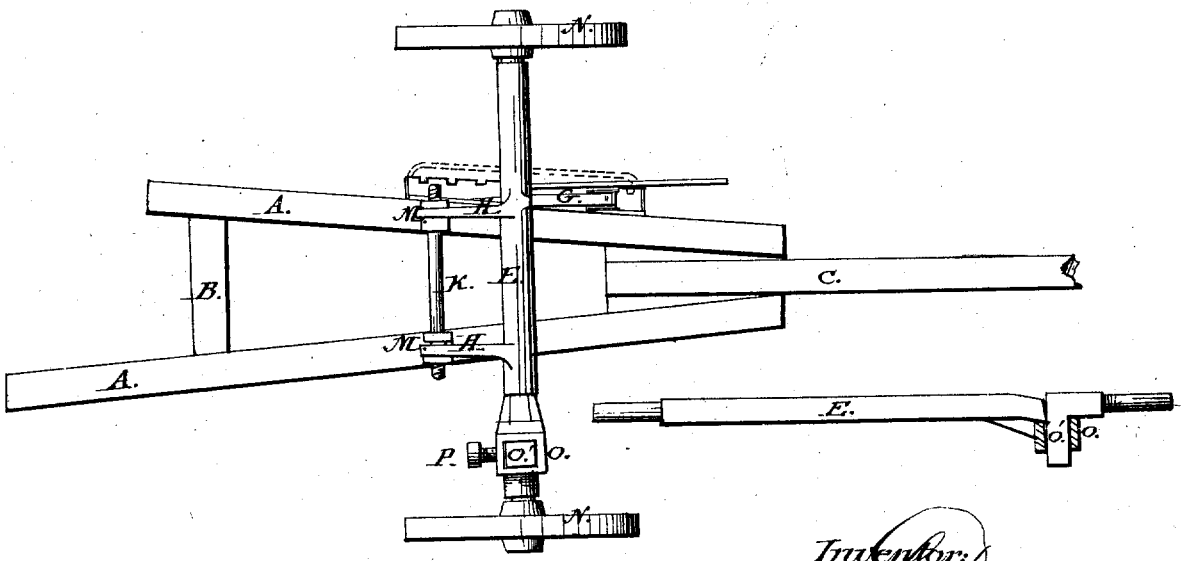
Figure 2 is a bottom view.

A rod, K, passes through the ends of the rear arms H H′, and eye-bolts M M, which enter the frame above. By this means the frame and the plows, which are shown in red, fig. 1, are balanced, allowing the axle to turn up and down on the wheels.

In order to level up the machine, so that both wheels N N will travel on the same plane, the axle is jointed near one end, and provided with a socket, O, in which the opposite end, O′, is placed, it being bent at right angles, where it is held and regulated by the set-screw P.

By this device for constructing and operating gang-plows, a great advantage is had, and a great leverage-power obtained by the driver, in operating the sweep for raising the plows entirely out of the ground, or regulating the depth in plowing.

Having thus described my invention,

What I claim, and desire to secure by Letters Patent, is—

1. Regulating the level of the machine by the device O O′, and set-screw P, or their equivalents, substantially as set forth.

2. The rigid arms H, H′, and G, attached to the axle, and connecting the lever or sweep J, either directly to the arm G, or by the link I, substantially as and for the purpose specified.

In witness whereof, I have hereunto set my hand and seal.

GUSTAVUS A. DAVISON. [L. S.]

Witnesses:

J. L. BOONE,

WILLIAM STANIFORTH.